Patented Feb. 9, 1943

2,310,221

UNITED STATES PATENT OFFICE 2,310,221

ARTIFICIAL FILAMENT AND THE LIKE

Russell O. Denyes, Pittsburgh, Pa., assignor to Tubize Chatillon Corporation, a corporation of Delaware No Drawing. Application February 8, 1941, Serial No. 378,194

23 Claims. (Cl. 18—54)

This invention relates to the production of artificial filaments and similar products such as films, sheets, ribbons, bands and the like, and aims generally to provide, as a new article of manufacture, artificial filaments composed wholly or in part of a glycinin (protein) derivative, as well as the method of making the same. More particularly, the invention contemplates the production of artificial filaments and the like composed in part or wholly of precipitated glycinin alkyl sulfoxylate resulting from acidifying a dispersion in an alkaline solution of glycinin and a hydroxyalkyl sulfoxylate. While the invention is herein more particularly described in its application to the production of artificial filaments, it is to be understood that it is equally applicable to the production of films, sheets, ribbons, bands, etc., and artificial filaments are to be considered as representative of such other products.

It is known that soybean protein can be dispersed in alkaline solutions to give viscous dispersions which can be extruded or spun into acidic coagulating baths to give artificial filaments. However, the usual alkaline dispersions of soybean protein have a number of disadvantages when employed for the production of such filaments. Such dispersions have a tendency toward gelation when high concentrations of protein are used, they are quite unstable by virtue of the fact that they putrefy readily, and decompose rapidly at an alkalinity greater than pH 10. Furthermore, such dispersions lack "stringiness" and possess surface properties which cause difficulty in the extruding or spinning operation.

As pointed out in my copending patent application, Serial No. 333,773, filed May 7, 1940, the solubility in dilute alkaline solutions of some proteins (e. g. soybean protein) is greatly increased by treating the protein with a hydroxyalkyl sulfoxylate, such as sodium formaldehyde sulfoxylate. The protein may be undenatured or partially or completely denatured by heat or certain organic solvents such as alcohol. Suitable dispersions may be prepared by treating soybean protein with an aldehyde or ketone sulfoxylate and dispersing the resulting product in an aqueous solution of an inorganic or an organic base. When such a dispersion is acidified, a precipitated product is formed which is much less soluble in alkaline solutions than is the original protein. Since soybean protein is essentially impure glycinin, the product of the reaction in an alkaline solution of soybean protein and a hydroxyalkyl sulfoxylate may be considered a "hydroxyalkyl sulfoxylate derivative of glycinin," and the product precipitated by acidifying that reaction product may be considered "precipitated glycinin alkyl sulfoxylate."

The present invention contemplates, as a new article of manufacture, an artificial filament composed in whole or in part of one or more precipitated glycinin alkyl sulfoxylates. In its preferred forms the artificial filament of the invention comprises a precipitated glycinin methyl sulfoxylate resulting from acidifying a dispersion in an alkaline solution of glycinin and an alkali-metal (for example sodium) or a zinc hydroxymethyl sulfoxylate. Such artificial filaments are produced by extruding or spinning a dispersion in an alkaline solution of a hydroxyalkyl sulfoxylate derivative of glycinin into an acidic precipitating or spinning bath. The alkaline dispersion of the hydroxyalkyl sulfoxylate derivative of glycinin possesses a number of advantages over the usual alkaline dispersions of soybean protein. The treatment of the protein with the hydroxyalkyl sulfoxylate, as for example sodium formaldehyde sulfoxylate, greatly increases the solubility of the protein, and thus permits the utilization of much more concentrated dispersions than would otherwise be possible. Furthermore, such dispersions do not show as marked a tendency toward gelation, the glycinin derivative is not as rapidly decomposed by alkalies, and dispersions of the derivative are not as subject to putrefaction as the usual alkaline solutions of soybean protein. A still further advantage of the invention, and one of particular importance, is that it permits the dispersion of denatured or partially denatured glycinin, and the production of artificial filaments and the like possessing characteristically different properties than those of artificial filaments produced from undenatured glycinin. For these and other reasons, alkaline dispersions of hydroxyalkyl sulfoxylate derivatives of glycinin yield, on spinning and finishing, artificial filaments and yarns of good tensile strength which possess protein characteristics, such, for example, as affinity for wool or silk type dyes.

The method of the invention consists essentially in dispersing glycinin in an alkaline solution in the presence of a hydroxyalkyl sulfoxylate, extruding or spinning the resulting dispersion in an acidic spinning bath, and appropriately collecting the resulting filaments (or the like) of precipitated glycinin alkyl sulfoxylate. The acidic spinning bath may contain from 1 to 10% of an appropriate acid, such as sulfuric acid or phosphoric acid, 10 to 25% of a suitable salt, such as sodium sulfate or sodium phosphate, and preferably 1% or more of glucose or its equivalent. Any of the procedures described in my aforementioned patent application for dispersing glycinin in an alkaline solution in the presence of a hydroxyalkyl sulfoxylate may be employed in preparing dispersions or spinning solutions for the practice of the invention. The water-soluble hydroxymethyl sulfoxylates, of which sodium formaldehyde sulfoxylate and zinc formaldehyde sulfoxylate are examples, are particularly available and satisfactory hydroxyalkyl sulfoxylates for the practice of the invention. All of the alkali-metal salts (including ammonium) of formaldehyde sulfoxylic acid have a satisfactory dispersing action on glycinin. The sodium, potassium and lithium salts have essentially the same dispersing action and can be used interchangeably without affecting to any great extent the properties of the resulting dispersion, while the ammonium salt gives a dispersion of somewhat different appearance and properties. A wide variety of agents may be employed to impart the contemplated alkalinity to the solution in which the dispersion of the glycinin is promoted by the hydroxyalkyl sulfoxylate. Sodium hydroxide is ordinarily the most available and satisfactory agent, but ammonium hydroxide, potassium hydroxide, calcium hydroxide, methyl amine, ethylenediamine and triethanolamine may be used.

In order to describe the invention more fully, the following examples are given. These examples illustrate certain of the ways in which suitable dispersion (i. e., spinning solutions) may be prepared, and some of the conditions under which such dispersions are spun into artificial filaments. It is to be understood, however, that these examples are merely illustrative of the invention and are not to be construed as limiting its scope.

Example I

Air-dry soybean protein (300 g.) was suspended in water (950 g.) and stirred for 15 minutes. Sodium formaldehyde sulfoxylate (100 g.) was added and the stirring was continued for 1 hour. Then sodium hydroxide (22 cc.; 50% NaOH) was introduced and the stirring was continued for 4 hours. At the end of this time a clear, dark green, viscous dispersion was obtained. The dispersion was then filtered, and aged for 16 hours in order to eliminate the air bubbles. Spinning was carried out on an experimental spinning machine of the type commonly employed in spinning viscose rayon by the spool or bobbin method. The spin bath contained 3% sulfuric acid, 20% sodium sulfate, and 10% glucose, and was maintained at 55–56° C. The yarn was spun vertically through 10 inches of spin bath at a take-up speed of 80 meters per minute. The yarn was treated with formaldehyde-sodium chloride solutions, washed, and dried at room temperature in a current of air.

Example II

Air-dry soybean protein (200 g.) was suspended in water (1000 g.) and stirred for 15 minutes. Zinc formaldehyde sulfoxylate (54 g.) was added, and the stirring continued for 1 hour. Then sodium hydroxide (44 cc.; 50% NaOH) was introduced, and the stirring was continued for 4 hours. A very viscous, straw-colored dispersion resulted. Filtering, aging, spinning, and treatment of the yarn were carried out essentially as described in the preceding example except that the yarn was stretched 10% immediately after leaving the spin bath.

Example III

Air-dry soybean protein (160 g.) was suspended in distilled water (700 g.) and the suspension stirred vigorously as the temperature was raised to the boiling point (30 minutes) and maintained at this temperature for 30 minutes. Additional water was added from time to time to replace that lost by evaporation. The weight of the suspension was then adjusted to 1000 g. by the addition of crushed ice, and the mixture cooled rapidly to 25° C. in an ice bath. Sodium formaldehyde sulfoxylate (50 g.) was added and the suspension was stirred for 1 hour. Then sodium hydroxide (11 cc.; 50% NaOH) was introduced, and the stirring was continued for 4 hours. Filtering, aging and spinning of the resulting dispersion and treatment of the yarn were carried out essentially as described in Example I, except that in the spinning operation the yarn traveled horizontally through 63 inches of spin bath. The yarn possessed the following characteristics: titer, 255 deniers; dry strength, 0.87 g./d. (grams per denier); dry elongation, 28.5%.

Example IV

A dispersion was prepared essentially as described in Example III. The dispersion, after filtering and aging, was spun vertically through 11 inches of spin bath, around rollers located just above the surface of the spin bath which stretched the yarn approximately 10%, and then onto a bobbin at a take-up speed of 80 meters per minute. The yarn was then treated with formaldehyde-sodium chloride solutions, washed and dried at room temperature in a current of air. The yarn characteristics were as follows: titer, 246 deniers; dry strength, 0.73 g./d.; dry elongation, 6.9%.

Example V

Air-dry soybean protein (148 g.) was suspended in distilled water (700 g.) and stirred vigorously as the temperature of the suspension was raised to the boiling point (30 minutes) and maintained at the boiling point for 30 minutes. Additional water was added from time to time to replace that lost by evaporation. The weight of the suspension was then adjusted to 1000 g. by the addition of crushed ice, and the mixture cooled rapidly to 25° C. in an ice bath. Sodium formaldehyde sulfoxylate (33.5 g.) and zinc formaldehyde sulfoxylate (13.5 g.) were added, and the suspension was stirred for 1 hour. Then sufficient sodium hydroxide was added to raise the pH of the dispersion to 10.5, and the stirring continued for 4 hours. The straw-colored, viscous dispersion was then aged for 16 hours under partial vacuum to eliminate the air bubbles. After filtering, the dispersion was spun using an experimental spinning machine of the type employed for the spinning of viscose rayon by the spool or bobbin method. The spin bath contained 1% sulfuric acid, 20% sodium sulfate, and 10% glucose, and was maintained at 55–56° C. The yarn was spun vertically through 13 inches of spin bath, then treated with formaldehyde-sodium chloride solutions, washed, and dried at room temperature in a current of air. The yarn possessed the following characteristics: deniers, 168; dry strength 0.6 g./d.; and dry elongation 7.8%.

Replacement of sodium formaldehyde sulfoxylate by zinc formaldehyde sulfoxylate produces a decided increase in the viscosity of the dispersion, changes its color from a dark green to a straw color, facilitates starting of the spinning operation, and gives a lighter colored and softer yarn. On the other hand, the tensile strength of the yarn decreases with increased concentration of zinc until a minimum is attained at a 3 to 17 ratio of zinc to sodium formaldehyde sulfoxylate. Further increase in the zinc-sodium ratio does not affect the tensile strength of the yarn.

*Example VI*

Air-dry soybean protein (320 g.) was suspended in distilled water (1400 g.) and stirred vigorously as the temperature was raised to 100° C. (30 minutes) and maintained at 99–100° C. for 30 minutes. Water was added from time to time to replace that lost by evaporation. Sufficient ice was then added to increase the total weight of the suspension to 2,000 g., after which it was cooled to 25° C., in an ice-bath. Sodium formaldehyde sulfoxylate (100 g.) was added and the suspension stirred for 1 hour. Sodium hydroxide (22 cc.; 50% NaOH) was then added and the stirring continued for 3 hours. The final addition was (2 g.) of "Olate flake," an olive oil soap containing a high percentage of sodium oleate manufactured by the Procter and Gamble Company, and the stirring continued for 1 hour. The dispersion was then filtered, and aged for 16 hours at 21° C. The viscosity of the dispersion (at time of spinning) was 341 sec. at 45° C. (using a Vercelli tube calibrated so that castor oil at 20° C. flowed between the two marks in 210 sec.). Spinning of the dispersion was carried out on an experimental machine of the type commonly used in spinning viscose rayon by the spool or bobbin method. The spin bath contained approximately 1% sulfuric acid, 20% sodium sulfate, and 10% glucose, and was maintained at 55–56° C. The yarn was spun vertically through 15 inches of spin bath at a take-up speed of 80 meters per minute. The yarn was treated with formaldehyde-sodium chloride solutions, washed with water, and dried at room temperature in a current of air, and possessed the following characteristics: titer, 139 deniers; dry strength, 0.7 g./d.; dry elongation, 5.2%.

Yarns prepared as described in the foregoing examples may be aftertreated in a variety of ways in order to render them resistant to dilute acid and alkaline solutions, for example, by treating them with aldehydes such as formaldehyde or glyoxal, inorganic tanning agents such as aluminum salts, or natural or synthetic organic tanning agents. One such method which has proven very successful is as follows: The yarn is treated for one hour with a solution containing 1.1 percent formaldehyde and 12.1 per cent sodium chloride, then treated for one hour with a solution containing 2.6 per cent formaldehyde and 11.6 per cent sodium chloride, then treated for one hour with a solution containing 3.7 per cent formaldehyde and 11.3 per cent sodium chloride, and finally treated for twenty hours with a 3.7 per cent formaldehyde solution saturated with sodium chloride.

Artificial filaments made in accordance with the invention have many useful attributes. Since they consist of a protein derivative, they are chemically analogous to natural wool fibers, and, accordingly, exhibit to a very substantial degree the chemical properties which are customarily associated with wool in the textile art. Thus, they possess good affinity for acidic and basic dyestuffs of the types commonly employed for silk and wool, and also show a good affinity for direct dyestuffs of the types employed for cotton or viscose rayon. They display pronounced resistance to deterioration in the presence of acid spray and fumes, and burn with the evolution of an odor reminiscent of scorched feathers, yielding a charry ash. These yarns also have a relatively smooth cross-section similar to that of silk or wool, by virtue of which they show low soil retention as compared with the usual viscose rayon which possesses a very irregular cross-section.

In their physical properties, they are governed largely by the methods employed in their manufacture. By spinning them according to the general principles of viscose rayon manufacture, they assume the form of smooth, lustrous, continuous threads. By spinning them according to the general principles of viscose staple fiber manufacture, particularly by cutting them into uniform lengths in the range of 2–10 inches shortly after extrusion and prior to any purification treatment, they can be made to assume the form of crimpy, fluffy, wool-like fibers.

The refractive index of artificial filaments of the invention is approximately 1.54. Hence, by incorporating chemically inert pigments or other finely divided foreign substances having refractive indices substantially removed from 1.54 in the dispersion prior to filtration and spinning, their opacity and luster can be controlled at will.

In color, filaments of the invention are generally pale yellow. They can be bleached by the usual methods employed for the bleaching of wool, for example, by the use of hydrogen peroxide.

In the form of continuous-filament threads, they may, with suitable lubrication or sizing, be woven and knitted into useful fabrics after the manner of viscose rayon. In the form of staple fiber, they may be carded, combed, drafted and spun after the manner of wool and wool fibers, or viscose staple fiber. They may be used in combination with the known artificial and natural fibers, and by virtue of this fact they may be used to produce many unusual and useful textiles. Thus, for instance, artificial filaments of the invention may be embodied in men's suitings, upholstery fabrics, ladies' dress goods, men's and children's hosiery, and the like, either as a diluent for wool or as an adjunctive material designed to produce novel cross-dyeing effects and to improve the thermal properties, especially in textiles composed largely of non-nitrogenous base yarns.

With respect to "hand," artificial filaments of the invention generally feel desirably sleek, soft, and feathery to the touch, although it will be understood by those familiar with the art of producing artificial yarns that the "hand" can be modified by varying the titer of the unitary filament, by modifying the spin bath composition in relation to the take-up speed, by the application of surface dressings, and the like.

I claim:

1. As a new article of manufacture, an artificial filament comprising precipitated glycinin alkyl sulfoxylate resulting from acidifying a dispersion in an alkaline solution of glycinin and a hydroxyalkyl sulfoxylate.

2. As a new article of manufacture, an artificial filament comprising precipitated glycinin methyl sulfoxylate resulting from acidifying a dispersion in an alkaline solution of glycinin and a hydroxymethyl sulfoxylate.

3. As a new article of manufacture, an artificial filament comprising the precipitated glycinin methyl sulfoxylate resulting from acidifying a dispersion in an alkaline solution of glycinin and an alkali-metal hydroxymethyl sulfoxylate.

4. As a new article of manufacture, an artificial filament comprising the precipitated glycinin methyl sulfoxylate resulting from acidifying a dispersion in an alkaline solution of glycinin and sodium formaldehyde sulfoxylate.

5. As a new article of manufacture, an artificial filament comprising the precipitated glycinin alkyl sulfoxylate resulting from acidifying a dispersion in an alkaline solution of glycinin and a zinc hydroxyalkyl sulfoxylate.

6. As a new article of manufacture, an artificial filament comprising the precipitated glycinin methyl sulfoxylate resulting from acidifying a dispersion in an alkaline solution of glycinin and a zinc hydroxymethyl sulfoxylate.

7. As a new article of manufacture, an artificial filament comprising the precipitated glycinin methyl sulfoxylate resulting from acidifying a dispersion in an alkaline solution of glycinin and zinc formaldehyde sulfoxylate.

8. As a new article of manufacture, an artificial filament comprising the precipitated glycinin alkyl sulfoxylates resulting from acidifying a dispersion in an alkaline solution of glycinin and a mixture of an alkali-metal and zinc hydroxyalkyl sulfoxylates.

9. As a new article of manufacture, an artificial filament comprising the precipitated glycinin methyl sulfoxylates resulting from acidifying a dispersion in an alkaline solution of glycinin and a mixture of an alkali-metal and zinc hydroxymethyl sulfoxylates.

10. As a new article of manufacture, an artificial filament comprising the precipitated glycinin methyl sulfoxylates resulting from acidifying a dispersion in an alkaline solution of glycinin and a mixture of sodium and zinc formaldehyde sulfoxylates.

11. The method of producing artificial filaments of a glycinin derivative which comprises dispersing glycinin in an alkaline solution in the presence of a hydroxyalkyl sulfoxylate, spinning the resulting dispersion in an acidic spinning bath, and collecting from the spinning bath the resulting filaments of precipitated glycinin alkyl sulfoxylate.

12. The method of producing artificial filaments of a glycinin derivative which comprises dispersing glycinin in an alkaline solution in the presence of a hydroxyalkyl sulfoxylate, spinning the resulting dispersion in an acidic spinning bath, collecting from the spinning bath the resulting filaments of precipitated glycinin alkyl sulfoxylate, and treating the collected filaments with solutions of formaldehyde and sodium chloride.

13. The method of producing artificial filaments of a glycinin derivative which comprises dispersing glycinin in an alkaline solution in the presence of a hydroxymethyl sulfoxylate, spinning the resulting dispersion in an acidic spinning bath, and collecting from the spinning bath the resulting filaments of precipitated glycinin methyl sulfoxylate.

14. The method of producing artificial filaments of a glycinin derivative which comprises dispersing glycinin in an alkaline solution in the presence of sodium formaldehyde sulfoxylate, spinning the resulting dispersion in an acidic spinning bath, and collecting from the spinning bath the resulting filaments of precipitated sodium glycinin methyl sulfoxylate.

15. The method of producing artificial filaments of a glycinin derivative which comprises dispersing glycinin in an alkaline solution in the presence of an alkali-metal hydroxymethyl sulfoxylate, spinning the resulting dispersion in an acidic spinning bath, collecting from the spinning bath the resulting filaments of precipitated alkali-metal glycinin methyl sulfoxylate, and treating the collected filaments with solutions of formaldehyde and sodium chloride.

16. The method of producing artificial filaments of a glycinin derivative which comprises dispersing glycinin in an alkaline solution in the presence of a zinc hydroxyalkyl sulfoxylate, spinning the resulting dispersion in an acidic spinning bath, and collecting from the spinning bath the resulting filaments of precipitated zinc glycinin alkyl sulfoxylate.

17. The method of producing artificial filaments of a glycinin derivative which comprises dispersing glycinin in an alkaline solution in the presence of zinc formaldehyde sulfoxylate, spinning the resulting dispersion in an acidic spinning bath, and collecting from the spinning bath the resulting filaments of precipitated zinc glycinin methyl sulfoxylate.

18. The method of producing artificial filaments of a glycinin derivative which comprises dispersing glycinin in an alkaline solution in the presence of a mixture of an alkali-metal and zinc hydroxyalkyl sulfoxylates, spinning the resulting dispersion in an acidic spinning bath, and collecting from the spinning bath the resulting filaments of precipitated alkali-metal and zinc glycinin alkyl sulfoxylates.

19. The method of producing artificial filaments of a glycinin derivative which comprises dispersing glycinin in an alkaline solution in the presence of a mixture of an alkali-metal and zinc hydroxymethyl sulfoxylates, spinning the resulting dispersion in an acidic spinning bath, collecting from the spinning bath the resulting filaments of precipitated alkali-metal and zinc methyl sulfoxylates, and treating the collected filaments with solutions of formaldehyde and sodium chloride.

20. The method of producing artificial filaments of a glycinin derivative which comprises dispersing glycinin in an alkaline solution in the presence of a mixture of sodium and zinc formaldehyde sulfoxylates, spinning the resulting dispersion in an acidic spinning bath, and collecting from the spinning bath the resulting filaments of precipitated sodium and zinc glycinin methyl sulfoxylates.

21. The method of producing artificial filaments of a glycinin derivative which comprises dispersing glycinin in an alkaline solution in the presence of a hydroxyalkyl sulfoxylate, spinning the resulting dispersion in an acidic spinning bath containing from 1 to 10% of an appropriate acid and from 10 to 25% of a suitable salt, and collecting from the spinning bath the resulting filaments of precipitated glycinin alkyl sulfoxylate.

22. The method of producing artificial filaments of a glycinin derivative which comprises dispersing glycinin in an alkaline solution in the presence of a hydroxyalkyl sulfoxylate, spinning the resulting dispersion in an acidic spinning bath containing from 1 to 10% sulfuric acid, from 10 to 25% sodium sulfate and at least 1% glucose, and collecting from the spinning bath the resulting filaments of precipitated glycinin alkyl sulfoxylate.

23. The method of producing artificial filaments of a glycinin derivative which comprises dispersing glycinin in an alkaline solution in the presence of a hydroxyalkyl sulfoxylate, spinning the resulting dispersion in an acidic spinning bath maintained at a temperature of approximately 55–56° C., and containing approximately 1 to 3% sulfuric acid, approximately 20% sodium sulfate and approximately 10% glucose, and collecting from the spinning bath the resulting filaments of precipitated glycinin alkyl sulfoxylate.

RUSSELL O. DENYES.